(12) United States Patent
Torsner et al.

(10) Patent No.: US 9,998,948 B2
(45) Date of Patent: *Jun. 12, 2018

(54) METHOD AND ARRANGEMENT IN A WIRELESS COMMUNICATION NETWORK

(71) Applicant: Unwired Planet, LLC, Plano, TX (US)

(72) Inventors: Johan Torsner, Masaby (FI); Michael Meyer, Aachen (DE); Janne Peisa, Espoo (FI)

(73) Assignee: Unwired Planet, LLC., Plano, TX (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/621,605

(22) Filed: Jun. 13, 2017

(65) Prior Publication Data

US 2017/0280352 A1    Sep. 28, 2017

Related U.S. Application Data

(63) Continuation of application No. 14/882,882, filed on Oct. 14, 2015, now Pat. No. 9,723,514, which is a
(Continued)

(51) Int. Cl.
*H04W 28/02* (2009.01)
*H04L 1/16* (2006.01)
*H04L 12/26* (2006.01)

(52) U.S. Cl.
CPC ....... *H04W 28/0289* (2013.01); *H04L 1/1607* (2013.01); *H04L 1/1685* (2013.01); *H04L 43/06* (2013.01); *H04L 43/062* (2013.01)

(58) Field of Classification Search
CPC ... H04W 28/0289; H04W 24/08–24/10; H04L 1/1685; H04L 1/16–1/1607;
(Continued)

(56) References Cited

U.S. PATENT DOCUMENTS 6,067,298 A    5/2000   Shinohara
6,212,189 B1   4/2001   Petty
(Continued)

FOREIGN PATENT DOCUMENTS

CN    1358375 A    7/2002
CN    1454017 A    11/2003
(Continued)

OTHER PUBLICATIONS

Chinese Office Action and English translation thereof dated Feb. 6, 2017 in Chinese application 201310275794.8.
(Continued)

*Primary Examiner* — Eric Myers
(74) *Attorney, Agent, or Firm* — Nixon & Vanderhye P.C.

(57) ABSTRACT

Method and arrangement in a first node for requesting a status report from a second node. The first node and the second node are both comprised within a wireless communication network. The status report comprises positive and/or negative acknowledgement of data sent from the first node, to be received by the second node. The first node comprises a first counter configured to count the number of transmitted Protocol Data Units, PDUs, and a second counter configured to count the number of transmitted data bytes. The method and arrangements comprises initialising the first and the second counter to zero, transmitting data to be received by the second node, comparing the value of the first and the second counters with a first threshold limit value and a second threshold limit value and requesting a status report from the second node if any of the threshold limit values is reached or exceeded.

16 Claims, 4 Drawing Sheets

Related U.S. Application Data continuation of application No. 13/862,828, filed on Apr. 15, 2013, now Pat. No. 9,167,475, which is a continuation of application No. 13/100,543, filed on May 4, 2011, now Pat. No. 8,477,604, which is a continuation of application No. 12/350,619, filed on Jan. 8, 2009, now Pat. No. 7,948,879, which is a continuation of application No. PCT/SE2008/051139, filed on Oct. 7, 2008.

(60) Provisional application No. 61/019,746, filed on Jan. 8, 2008.

(58) Field of Classification Search
CPC .......................... H04L 43/06–43/067; H04L 43/0823–43/0847; H04L 43/10–43/106; H04L 43/16
See application file for complete search history.

(56) References Cited

U.S. PATENT DOCUMENTS

| | | | |
|---|---|---|---|
| 6,308,073 | B1 | 10/2001 | Petty et al. |
| 6,671,257 | B1 | 12/2003 | Soumiya et al. |
| 6,707,820 | B1 | 3/2004 | Arndt et al. |
| 6,947,394 | B1 | 9/2005 | Johansson et al. |
| 7,761,767 | B2 | 7/2010 | Chandra et al. |
| 7,948,879 | B2 | 5/2011 | Torsner et al. |
| 2003/0202501 | A1 | 10/2003 | Jang |
| 2004/0017781 | A1 | 1/2004 | Alferness et al. |
| 2006/0067238 | A1 | 3/2006 | Olsson et al. |
| 2006/0245357 | A1 | 11/2006 | Ilan |
| 2006/0291395 | A1 | 12/2006 | Ketonen et al. |
| 2007/0025242 | A1 | 2/2007 | Tsang |
| 2007/0104485 | A1 | 5/2007 | Zhang |
| 2008/0212561 | A1 | 9/2008 | Pani |
| 2008/0225824 | A1 | 9/2008 | Meylan et al. |
| 2009/0028126 | A1 | 1/2009 | Meylan |
| 2009/0103478 | A1 | 4/2009 | Sammour et al. |
| 2009/0175163 | A1 | 7/2009 | Sammour et al. |
| 2009/0303893 | A1 | 12/2009 | Lee et al. |
| 2010/0085880 | A1 | 4/2010 | Torsner et al. |

FOREIGN PATENT DOCUMENTS

| | | |
|---|---|---|
| EP | 1 764 980 A1 | 3/2007 |
| WO | WO 2008/097544 A2 | 8/2008 |

OTHER PUBLICATIONS

Federal Patent Court Judgment in the patent nullity case Docket No. 5 Ni 28/14 (EP) dated Sep. 20, 2016.

3GPP TS 36.322 V8.1.0 (Mar. 2008), Technical Specification; 3rd Generation Partnership Project; Technical Specification Group Radio Access Network; Evolved Universal Terrestrial Radio Access (E-UTRA) Radio Link Control (RLC) protocol specification (Release 8). Allegedly published on Mar. 17, 2008. 35 p.

3GPP TS 36.322 V8.2.0 (May 2008), Technical Specification; 3rd Generation Partnership Project; Technical Specification Group Radio Access Network; Evolved Universal Terrestrial Radio Access (E-UTRA) Radio Link Control (RLC) protocol specification (Release 8). Published on Jun. 25, 2008. 36 p.

3GPP TS 36.322 V8.3.0 (Sep. 2008), Technical Specification; 3rd Generation Partnership Project; Technical Specification Group Radio Access Network; Evolved Universal Terrestrial Radio Access (E-UTRA) Radio Link Control (RLC) protocol specification (Release 8). Allegedly published on Sep. 18, 2008. 38 p.

Tdoc R2-080236, 3GPP TSG-RAN, WG2 #60bis, Seville, Spain, Jan. 14-18, 2008; Agenda Item: 5.1.2.5; Source: Ericsson; Title: RLC Polling for continuous transmission; Document for: Discussion, Decision. 2 p.

Document list of a 3GPP service as evidence of the previous publication of the document NK6. URL: http://www.3gpp.org/ftp/tsg_ran/wg2_r12/TSGR2_6obis/Docs/ [downloaded on Jun. 18, 2014]; 10 p.

Tanenbaum, A.S.: Computer Networks. 3rd ed. Prentice-Hall, Inc.: New Jersey. S. vi-xvii, S. 16-35. ISBN 0-13394248-1, Copyright © 1997.

ETSI TS 136 300 V8.0.0 (Mar. 2007), Technical Specification; Universal Mobile Telecommunications System (UMTS); Evolved Universal Terrestrial Radio Access (E-UTRA) and Evolved Universal Terrestrial Radio Access (E-UTRAN); Overall description; Stage 2 (3GPP TS 36.300 version 8.0.0 Release 8). S. 1-14; p. 28-34.

3GPP TR 25.913 V7.3.0 (Mar. 2006), Technical Report. 3rd Generation Partnership Project; Technical Specification Group Radio Access Network; Requirements for Evolved UTRA (E-UTRA) and Evolved UTRAN (E-UTRAN) (Release 7). 14 P.

Tdoc R2-061398, 3GPP TSG-RAN WG2 #53, Shanghai, China, May 8-12, 2006; Agenda Item: 11; Source: Ericsson; Title: HARQ-ARQ Interactions; Document for: Discussion and Decision. 6 p.

Tdoc R2-080167, 3GPP TSG-RAN2 Meeting #60bis, Source: Samsung; Title: Triggers for RLC polling; Document Sevilla, Spain, Jan. 14-18, 2008; Agenda Item: 5.1.2.5; for: Discussion/Decision. 2 p.

R2-061861, 3GPP TSG-RAN WG2 ad-hoc on LTE, Ericsson, "HARQ-ARQ Interactions", Cannes, France, Jun. 27-30, 2006.

R2-062219, 3GPP TSG-RAN2 Meeting #54, Samsung, "Analysis on R6 RLC", Tallinn, Estopia, Aug. 28-Sep. 1, 2006.

R2-062432, 3GPP TSG-RAN WG2#54, Siemens, "ARQ-HARQ", Tallinn, Estopia, Aug. 28-Sep. 1, 2006.

R2-062775, 3GPP TSG-RAN2 Meeting #55, Samsung, "Analysis on R6 RLC", Seoul, Korea, Oct. 9-13, 2006.

R2-062843, 3GPP TSG-RAN WG2#55, Siemens, "ARQ Operation and HARQ", Seoul, Korea, Oct. 9-13, 2006.

R2-063118, 3GPP TSG-RAN2 Meeting #56, Samsung, "Lite RLC vs. Normal RLC", Riga, Latvia, Nov. 6-10, 2006.

R2-070133, 3GPP TSG-RAN2 Meeting #56bis, Samsung, "Lite RLC vs. Normal RLC", Sorrento, Ital, Jan. 15-19, 2007.

R2-070547, 3GPP TSG-RAN2 Meeting #57, Samsung, "*Lite RLC vs. Normal RLC*,"2 St. Louis, US, Feb. 12-16, 2007.

R2-071139, 3GPP TSG-RAN2 Meeting #57bis, Samsung, "*Lite RLC vs. Normal RLC*", St. Julians, Malta, Mar. 26-30, 2007.

R2-071709 3GPP TSG-RAN2 Meeting #58, Samsung, "*Lite RLC vs. Normal RLC*", Kobe, Japan May 7-11, 2007.

R2-072467, 3GPP TSG-RAN2 Meeting #58bis, Samsung, "*Lite RLC vs. Normal RLC*", Orlando, US, Jun. 25-29, 2007.

R2-072471, 3GPP TSG RAN WG2 #58bis, InterDigital Communications Corporation, "On HARQ-ARQ Interactions", Orlando, USA, Jun. 29-29, 2007.

R2-072568, TSG-RAN WG2 Meeting 58bis, Ericsson, "RLC Status Reporting Mechanisms", Orlando, USA, Jun. 25-30, 2007.

R2-073121, 3GPP TSG RAN WG2 #59, ASUSTeK, "Poll Triggers and Status Report Triggers for ARQ Procedures", Athens, Greece, Aug. 20-24, 2007.

R2-073167, 3GPP TSG-RAN WG2 Meeting #59, Huawei, "RLC Status Report Triggers", Athens, Greece, Aug. 20-24, 2007.

R2-073174, 3GPP TSG-RAN WG2 meeting #59, Huawei, "RLC Status PDU Type and Format", Athens, Greece, Aug. 20-24, 2007.

R2-073575, 3GPP TSG RAN W62 #59, NTT DoCoMo, Inc., "RLC Polling and Status Reporting Triggers", Athens, Greece: Aug. 20-24, 2007.

R2-073895, 3GPP TSG-RAN WG2 Meeting #59bis, Nokia Corporation, Nokia Siemens Networks, "Polling and Status Reporting", Shanghai, China, Oct. 8-12, 2007.

R2-073901, 3GPP TSG-RAN WG2 Meeting #59bis, Nokia Corporation, Nokia Siemens Networks, "Combined RLC ARQ Text Proposals", Shanghai, China, Oct. 8-12, 2007.

R2-073967, 3GPP TSG-RAN WG2 Meeting #59bis, Huawei, "RLC Status and Polling Triggers", Shanghai, China, Oct. 8-12, 2007.

R2-0741065, 3GPP TSG-RAN WG2 Meeting #59bis, ASUSTek, "Poll Triggers and Status Report Triggers for ARQ Procedures", Shanghai, China, Oct. 8-12, 2007.

(56) References Cited

OTHER PUBLICATIONS

R2-074169, 3GPP TSG RAN WG2 #59bis, CATT, "RLC Status Reporting Mechanisms and Missing PDU Detection", Shanghai, China, Oct. 8-12, 2007.
R2-074172, 3GPP TSG RAN WG2 #59bis, NTT DoCoMo, Inc., "RLC SN Field Size for AM Data Transfer", Shanghai, China, Oct. 8-12, 2007.
R2-074190, 3GPP TSG RAN WG2 #59bis, NTT DoCoMo, Inc. (Editor), "Open Issue List for State 3 E_UTRA RLC version 3", Shanghai, China, Oct. 8-12, 2007.
R2-074243, 3GPP TSG-RAN WG2 #59bis, LG Electronics Inc., "RLC Status Report Trigger and Polling", Shanghai, China, Oct. 8-12, 2007.
R2-074268, 3GPP TSG-RAN2 Meeting #59bis, Samsung, "Triggers for Polling and Status Reporting", Shanghai, China, Oct. 8-12, 2007.
R2-074366, 3GPP TSG RAN WG2 #59bis, Alcatel-Lucent, "Triggers for Polling and Status Report for LTE", Shanghai, China, Oct. 8-12, 2007.
R2-074398, 3GPP TSG-RAN WG2, Motorola, "RLC Polling Related Issues", Shanghai, China, Oct. 8-12, 2007.
R2-074536, 3GPP TSG RAN WG2 #59bis, "LTE User Plane Session Report", Shanghai, China, Oct. 8-12, 2007.
R2-074633, 3GPP TSG-RAN WG2, Motorola, "RLC Window Operations", Jeju, South Korea, Nov. 5-9, 2007.
R2-074979, 3GPP TSG-RAN WG2 #60, LG Electronics Inc., "RLC Status Report Trigger and Polling" Jeju, South Korea, Nov. 5-9, 2007.
R2-075015, 3GPP TSG-RAN2 Meeting #60, Samsung, "RLC Transmitting/Receiving Window", Jeju, South Korea, Nov. 5-9, 2007.
R2-075120, 3GPP TSG-RAN WG2 Meeting #60bis, Qualcomm Europe, "LTE SDU Discard", Jeju, South Korea, Nov. 5-9, 2007.
R2-075130, 3GPP TSG-RAN WG2 Meeting #60, ASUSTeK, "Analysis of Retransmitting Timers", Jeju, South Korea, Nov. 5-9, 2007.
R2-075155 3GPP RSG RAN WG2 #60, NTT DoCoMo, Inc. (Editor), "Open Issue List for State 3 E-UTRA RLC version 4", Ceju, South Korea, Oct. 5-9, 2007.
R2-071618, 3GPP TSG-RAN WG2#58, InterDigital, "Window-Based Polling With Flexible RLC PDU Size", Kobe, Japan, May 7-11, 2007.
Qualcomm Europe LTE SDU Discard. 3GPP TSG-RAN WG2 Meeting $60bis R2-075120, Nov. 2007.
3GPP 34d Generation Partnership Project, Technical Specification Group Radio Access Network; Evolved Universal Terrestrial Radio Access (E-UTRA) Radio Link Control (RLC) Protocol Specification (Release 8) 3GPP TS 36.22 v8.0.0, Dec. 2007.
NTT DoCoMo. Inc. RLC Polling and Status Reporting Triggers, 3GPP TSG RAN WG2 #59bis, R2-074176, Oct. 2007.
Motorola RLC Polling Related Issues, 3GPP TSG-RAN WG2, R2-073538, Aug. 2007.
ETSI TS 125 322 V3.18.0, Universal Mobile Telecommunications System (UMTS); Radio Link Control (RLC) protocol specification (3GPP TS 25.322 version 3.18.0 Release 1999)—Mar. 2004.
ETSI TS 125 322 V7.2.0, Universal Mobile Telecommunications System (UMTS); Radio Link Control (RLC) protocol specification (3GPP TS 25.322 version 7.2.0 Release 7)—Sep. 2006.
ETSI TS 125 322 V6.5.0; Universal Mobile Telecommunications System (UMTS); Radio Link Control (RLC) protocol specification (3GPP TS 25.322 version 6.5.0 Release 6)—Sep. 2005.
Tdoc R2-074270, 3GPP TSG-RAN2 Meeting #59bis, Shanghai, China, "RLC Transmission/Receiving Window", Samsung, Oct. 8-12, 2007.
3GPP TS 36.322 V1.0.0 (Sep. 2007), 3rd Generation Partnership Project; Technical Specification Group Radio Access Network; Evolved Universal Terrestrial Radio Access (E-UTRA) Radio Link Control (RLC) protocol specification (Release 8).
Technical proposal R2-073937 of ZTE: "RLC polling and status reporting", 3GPP TSG-RAN, WG2 #59bis, Shanghai Oct. 8-12, 2007.
Technical proposal R2-074176 of NTT DoCoMo: "RLC polling and status reporting triggers", 3GPP TSG-RAN, WG2 #59bis, Shanghai, Oct. 8-12, 2007.
Motorola TDoc-R2-073538, "RLC Polling Related Issues", Aug. 20-24, 2007.
Notice of Allowance dated Apr. 10, 2017 in U.S. Appl. No. 14/882,882.
Notice of Allowance dated Mar. 15, 2017 in U.S. Appl. No. 14/882,882.
Notice of Allowance dated Nov. 25, 2016 in U.S. Appl. No. 14/882,882.
Final Office Action dated Jul. 28, 2016 in U.S. Appl. No. 14/882,882.
Office Action dated Jan. 20, 2016 in U.S. Appl. No. 14/882,882.
Notice of Allowance dated Jun. 10, 2015 in U.S. Appl. No. 13/862,828.
Notice of Allowance dated Feb. 25, 2015 in U.S. Appl. No. 13/862,828.
Office Action dated Aug. 4, 2014 in U.S. Appl. No. 13/862,828.
Notice of Allowance dated Dec. 7, 2012 in U.S. Appl. No. 13/100,543.
Notice of Allowance dated Nov. 24, 2010 in U.S. Appl. No. 12/350,619.
Office Action dated Jun. 28, 2010 in U.S. Appl. No. 12/350,619.
Indian First Examination Report dated Sep. 27, 2017 in Indian Application No. 2644/CHENP/2010.
Chinese Fourth Office Action and English transmittal dated Aug. 2, 2017 in Chinese Application No. 201310275794.8.
3GPP TS 36.322 V8.0.0, Technical Specification; $3^{rd}$ Generation Partnership Project; Technical Specification Group Radio Access Network; Evolved Universal Terrestrial Radio Access (E-UTRA) Radio Link Control (RLC) protocol specification (Release 8) (Dec. 2007).
Chinese Notification to Grant Patent Right for Invention dated Dec. 15, 2017 in Chinese application 201310275794.8.

METHOD AND ARRANGEMENT IN A WIRELESS COMMUNICATION NETWORK

RELATED APPLICATIONS

This application is a continuation of U.S. patent application Ser. No. 14/882,882 filed Oct. 14, 2015 (pending) which is a continuation of U.S. patent application Ser. No. 13/862, 828 filed Apr. 15, 2013 (U.S. Pat. No. 9,167,475), which is a continuation of U.S. patent application Ser. No. 13/100, 543 (U.S. Pat. No. 8,477,604) filed May 4, 2011, which is a continuation of U.S. patent application Ser. No. 12/350,619 filed Jan. 8, 2009 (U.S. Pat. No. 7,948,879), which is a continuation of International Application No. PCT/SE2008/051139, filed on Oct. 7, 2008, which claims benefit of U.S. Patent Application No. 61/019,746, filed Jan. 8, 2008, the disclosures of which are fully incorporated herein by reference. U.S. patent application Ser. No. 12/350,619 filed Jan. 8, 2009 (U.S. Pat. No. 7,948,879) claims priority of U.S. Patent Application No. 61/019,746, filed Jan. 8, 2009, the disclosures of which are fully incorporated herein by reference.

TECHNICAL FIELD

The present invention relates to a method and an arrangement in a first node comprised in a wireless communication network. In particular it relates to a mechanism for Radio Link Control (RLC) polling for continuous transmission within the wireless communication network.

BACKGROUND

The transmission quality of a wireless communication and/or coherence properties of a communication channel between two nodes, such as e.g. a base station and a user equipment within a wireless communication system may differ, depending on a plurality of unwanted influence on the signal and the radio propagation conditions. Some non limiting examples of such unwanted influence may be e.g. thermal noise and interference and some examples of phenomena that adversely affect the propagation conditions are path loss, signal multi-path, and Doppler spread. Further the accuracy of channel estimation will affect the transmission quality. Thus data units such as e.g. a Protocol Data Unit (PDU) sent from one node may arrive at the receiving node distorted or not at all. In practice RLC PDUs may be received out of order due to that different RLC PDUs are experiencing different number of Hybrid automatic repeat-request (HARQ) retransmissions which may cause reordering.

It may then be necessary for the sending node to resend lost or distorted data units to the receiving node. In order to perform a resending, the sending node in some way has to be informed which data, if any, to resend to the receiving node.

One mechanism that may be used in order for the sending node to know if data has to be resent is to poll the receiving node to send a status report back to the sending node.

The RLC protocol applied in an evolved UTRAN (E-UTRAN), also denoted Long Term Evolution (LTE), has been defined in the document 3GPP TS 36.322 "Evolved Universal Terrestrial Radio Access (E-UTRA), Radio Link Control (RLC) protocol specification Release 8" issued by the 3rd Generation Partnership Project (3GPP). The RLC protocol includes a polling procedure that transmits polls according to a number of criteria. When a poll is triggered the RLC transmitter will set a poll bit in the RLC header, the poll bit serving as a request for a peer entity to send an RLC status report. Currently agreed criteria for setting the poll bit are:

Firstly, transmission of last Protocol Data Unit (PDU) in a buffer, i.e. a poll is sent when the last PDU available for transmission or retransmission is transmitted.

Secondly, the expiry of a poll retransmission timer, i.e. a timer is started when a PDU containing the poll is sent and the PDU is retransmitted if the PDU with the poll bit is not acknowledged when the timer expires.

Such criteria for setting poll bits may work well for bursty traffic, where the poll is sent for the last PDU in each burst. For continuous transmission however, additional triggers may has to be considered. A properly designed polling procedure can be used to limit the number of outstanding, i.e. transmitted but not acknowledged, PDUs, or bytes, and to avoid stalling situations. Two mechanisms, counter-based and window-based, have been identified to avoid protocol stalling. Protocol stalling is an expression signifying that no more new data can be transmitted. Further, the polling mechanism may operate either on transmitted RLC PDUs or on transmitted bytes.

A counter-based mechanism counts the amount of transmitted PDUs, or bytes, and sets the poll bit when a configured number of PDUs, or bytes, have been transmitted.

A window-based mechanism is similar but transmits the poll only when the amount of outstanding data exceeds a certain number of PDUs, or bytes. A window-based mechanism may need additional logic to transmit the poll regularly as long as the amount of outstanding data exceeds the threshold.

However, none of the existing mechanisms does take into account that stalling sometimes may occur due to sequence number limitations and sometimes due to memory limitations. In particular, the buffer memory of a user equipment such as e.g. a mobile phone may be limited.

The user access quality and overall capacity in a wireless communication network environment is affected by data loss and protocol stalling, but also by unnecessary polls and resending of data.

SUMMARY

It is therefore an object of the present invention to provide an improved wireless communication system.

According to a first aspect, the object is achieved by a method in a first node for requesting a status report from a second node. The first node and the second node are comprised within a wireless communication network. The status report comprises positive and/or negative acknowledgement of data sent from the first node to be received by the second node. When transmitting a sequence of data units or data unit segments to be received by the second node, the first node counts the number of transmitted data units and the number of transmitted data bytes. The first node then requests a status report from the second node, if the counted number of transmitted data units or the counted number of transmitted data bytes exceeds or equals a predefined respective value.

According to a second aspect, the object is also achieved by an arrangement in a first node for requesting a status report from a second node. The first node and the second node are comprised within a wireless communication network. The status report comprises positive and/or negative acknowledgement of data sent from the first node to be received by the second node. The arrangement comprises a transmitter. The transmitter is adapted to transmit a sequence of data units or data unit segments to be received by the second node. Further, the arrangement also comprises a counting mechanism. The counting mechanism is adapted to count the number of transmitted data units and the number of transmitted data bytes. Further yet, the arrangement comprises a requesting unit. The requesting unit is adapted to request a status report from the second node if the counted number of transmitted data units or the counted number of transmitted data bytes exceeds or equals predefined values.

Thanks to the present methods and arrangements, superfluous polling due to both sequence number limitation and memory limitation is avoided by help of one single mechanism. By combining the two criteria "transmitted number of data units" and "transmitted number of bytes" into one mechanism, it is avoided that a poll is unnecessarily sent when the first criterion is fulfilled in situation when such a poll has already recently been triggered due to the other, second criterion. Thus unnecessary signalling between the nodes comprised within the wireless communication system is reduced, which leads to reduced overhead signalling and thereby increased system capacity. Thus an improved wireless communication system is provided as a consequence of the present improved mechanism for polling within the wireless communication network.

It is a further advantage of the present invention that the mechanism operates on both bytes and data units and thus avoids stalling due to both sequence number limitations and memory limitations. This is advantageously achieved by a single mechanism coordinating the polling by two criteria leading to an efficient polling mechanism.

An advantage of the present method and arrangement is that the generation of superfluous polls is eliminated or at least reduced.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present method or arrangement to any of the particular forms disclosed, but on the contrary, the present method and arrangement is to cover all modifications, equivalents, and alternatives falling within the scope of the invention as defined by the claims.

Figure 1:
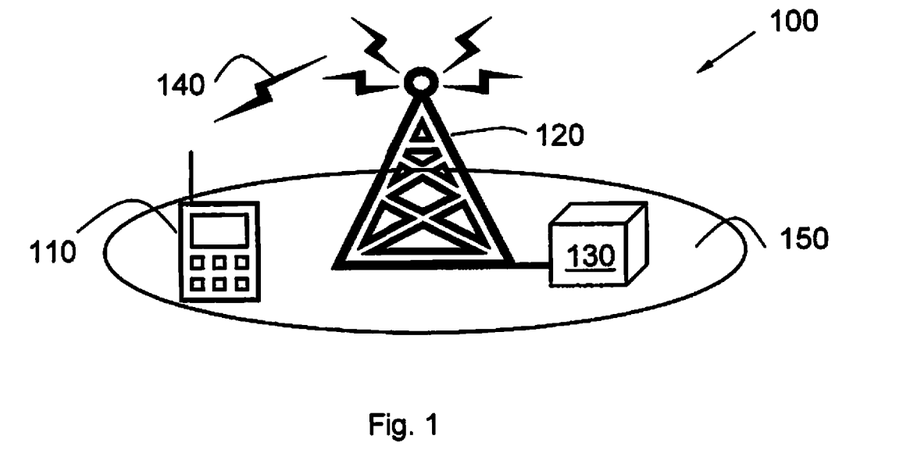
FIG. 1 is a schematic block diagram illustrating embodiments of a wireless communication network.

FIG. 1 depicts a first node 110 communicating with at least one second node 120 in a wireless communication network 100. The communication between the first node 110 and the second node 120 may be made e.g. over a communication carrier 140 in a cell 150 comprised in the wireless communication network 100.

It will be appreciated that the number of components illustrated in FIG. 1 is purely exemplary. Other configurations with more, fewer, or a different arrangement of components may be implemented. Moreover, in some embodiments, one or more components in FIG. 1 may perform one or more of the tasks described as being performed by one or more other components in FIG. 1.

The wireless communication network 100 may also comprise a control node 130, according to some optional embodiments, depending on the technology used. The control node 130 may be e.g. a Radio Network Controller (RNC).

The control node 130 is a governing element in the wireless communication network 100, which may be responsible for the control of base stations e.g. the second node 120, which are connected to the control node 130. The control node 130 may carry out radio resource management and some of the mobility management functions.

In some embodiments, the first node 110 may be represented by e.g. a user equipment, a wireless communication terminal, a mobile cellular telephone, a Personal Communications Systems terminal, a Personal Digital Assistant (PDA), a laptop, a computer or any other kind of device capable of managing radio resources. A Personal Communication System terminal may combine a cellular radiotelephone with data processing, facsimile and data communications capabilities. A PDA may include a radiotelephone, a pager, an Internet/intranet access device, a web browser, an organizer, calendars etc.

The first node 110 may however in some embodiments be represented by a base station, such as e.g. an access point, a Node B, an evolved Node B (eNode B) and/or a base transceiver station, Access Point Base Station, base station router, etc depending e.g. of the radio access technology and terminology used.

The second node 120 may in some embodiments be referred to as e.g. a base station, an access point, a Node B, an evolved Node B (eNode B) and/or a base transceiver station, Access Point Base Station, base station router, etc depending e.g. of the radio access technology and terminology used.

Further, according to some embodiments, the second node 120 may be represented by a user equipment, a wireless communication terminal, a mobile cellular telephone, a Personal Communications Systems terminal, a Personal Digital Assistant (PDA), a laptop, a computer or any other kind of device capable of managing radio resources.

However, in the non limiting example depicted in FIG. 1, the first node 110 is a mobile cellular telephone and the second node 120 is a base station.

The wireless communication network 100 may be based on technologies such as e.g. E-UTRAN, LTE, Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), TD-SCDMA, Wimax, etc.

As a non limiting example only, and for purely illustrative purpose this description is written with the invention embodied in an E-UTRAN environment. However, the present method and arrangement may be used also in other technology environments.

Figure 2:
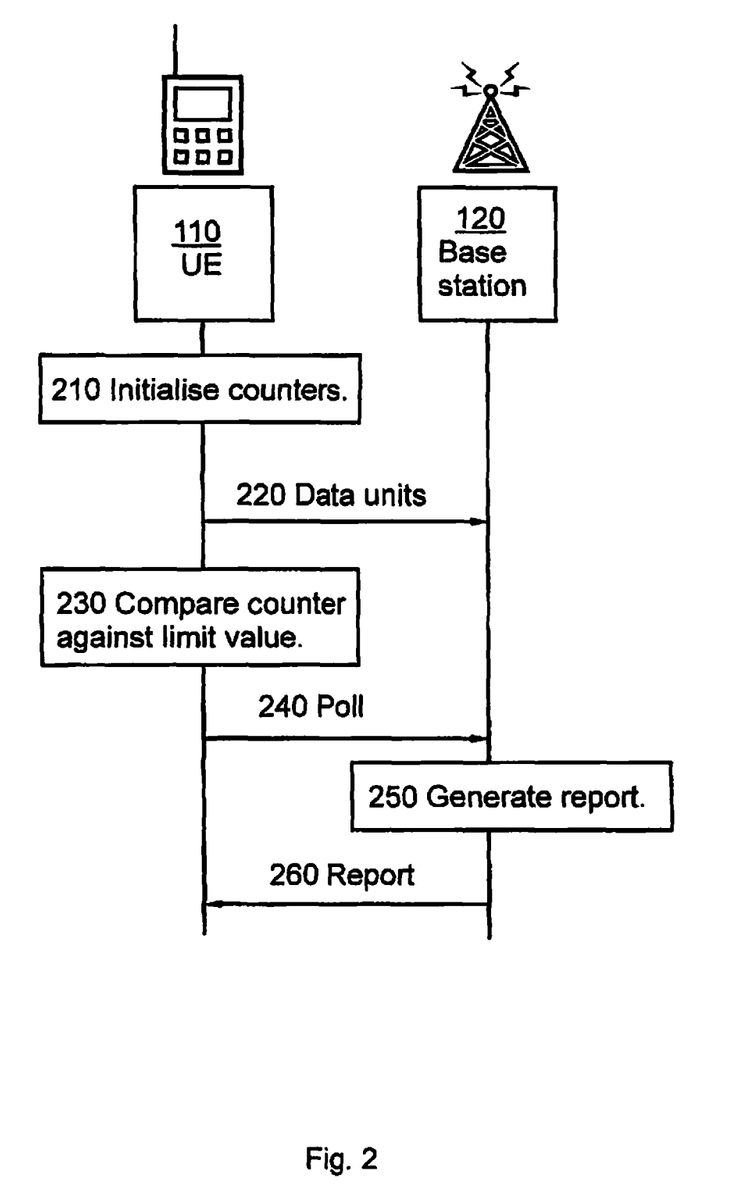
FIG. 2 is a combined signalling scheme and flow chart illustrating embodiments of a wireless communication network.

FIG. 2 is a combined signalling and flowchart that depicts method steps and the transmission of signals between a first node 110 and a second node 120 within a wireless communication network 100.

A general concept of the present method and arrangement is to combine the previously discussed criteria of transmitted number of data units such as e.g. PDUs and the number of data bytes of the transmitted data units into a single mechanism in order to trig a poll, e.g. a request for a status report from the second node 120.

STEP 210

The first node 110 may comprise a data unit counter and a bytes counter. The first node 110 may begin a transmission session by initialising a data unit counter and a bytes counter to zero in a first step 210.

STEP 220

The first node 110 then transmits data units e.g. to be received by the second node 120. For each transmitted data unit, the data unit counter is accordingly increased and for each byte sent, the bytes counter is increased.

STEP 230

A comparison is then made, concerning if the data unit counter has reached or exceeded a first threshold limit value. Also, a further comparison is made concerning if the byte counter has reached or exceeded a second threshold limit value.

The first and the second threshold limit values may be predetermined or set e.g. depending of the type of data that is sent, as some types of data may be more sensitive to loss than other types of data. The first and the second threshold limit values may be set by the network 100, e.g. by the Radio Resource Control (RRC) protocol. In LTE the thresholds are configured by RRC. In WCDMA/HSPA the thresholds may also be configured by RRC which for HSPA is terminated in the RNC 130 and the user equipment. For LTE the RRC is terminated in the eNodeB and the user equipment.

STEP 240

If any of the first or the second threshold limit values is reached or exceeded, a poll is triggered. Thus a poll is generated at the first node 110 and sent to the second node 120. Also, the data unit counter and the Byte counter are reset after sending the poll, according to some embodiments.

STEP 250

The second node 120, when receiving the poll, generates a status report concerning the received data.

STEP 260

The generated status report is sent from the second node 120 to the first node 110.

The threshold limit values concerning transmitted data units and transmitted bytes may be referred to as PDU_Threshold and ByteThreshold, respectively.

The threshold limit values PDU_Threshold or ByteThreshold may be set to any arbitrary value. In some particular embodiments, any of the first or the second threshold limit values may be set to a value representing infinite threshold value or mechanism disabled. The present mechanism thus, according to some embodiments, may operate as a pure byte based solution, in case the PDU_Threshold is set to an infinite threshold value. Alternatively, the present mechanism may operate as a pure counter based solution, in case the ByteThreshold is set to an infinite threshold value.

The described method may be denoted, in a compressed way of writing:

Initialise PDU_Counter and ByteCounter to their starting values;
[transmit data];
IF (PDU_Counter≥PDU_Threshold) OR (ByteCounter≥ByteThreshold) THEN
Trigger a poll;
Reset PDU_Counter AND ByteCounter;
END IF.

The benefit with the above described procedure is that stalling due to both sequence number limitation and memory limitation can be avoided by help of one single mechanism. By combining the two criteria into one mechanism it may be avoided that a poll is unnecessarily sent when a first criterion is fulfilled in situations when such a poll has already recently been triggered due to the other, second criterion.

In order to clarify and further illustrate the present method, yet an example is discussed below. However, it is to be noted that this is a non limiting example only, not intended to limit the scope of the present method in any way, which scope is limited by the independent claims only.

According to some embodiments, the configured parameter byte threshold limit value, ByteThreshold, may be scaled in accordance with the number of configured or active bearers. Thus, according to some embodiments the network 100 may configure the byte threshold limit value ByteThreshold and polling may be triggered when the byte threshold limit value per number of radio bearers have been transmitted.

Thus, expressed in a compressed way of writing:

Initialise PDU_Counter and ByteCounter to their starting values;
[transmit data];
determine the number of radio bearers;
IF (PDU_Counter≥PDU_Threshold) OR (ByteCounter≥ (ByteThreshold/number_of_bearers)) THEN
Trigger a poll;
Reset PDU_Counter AND ByteCounter;
END IF.

This scaling which also takes the number of radio bearers into account, compensates for the fact that memory may be occupied by outstanding data units e.g. PDUs on each radio bearer.

Although the present invention has been described for implementation in an evolved UTRAN (E-UTRAN) environment, similar principles may also be applicable for UTRAN when flexible data unit sizes are introduced e.g. flexible RLC PDU sizes.

An advantage of the present methods and arrangements is that they operate on both bytes and data units and avoids stalling due to both sequence number limitation and memory limitation. This is achieved by a single mechanism which coordinates the polling by two criteria leading to an efficient polling.

Figure 3:
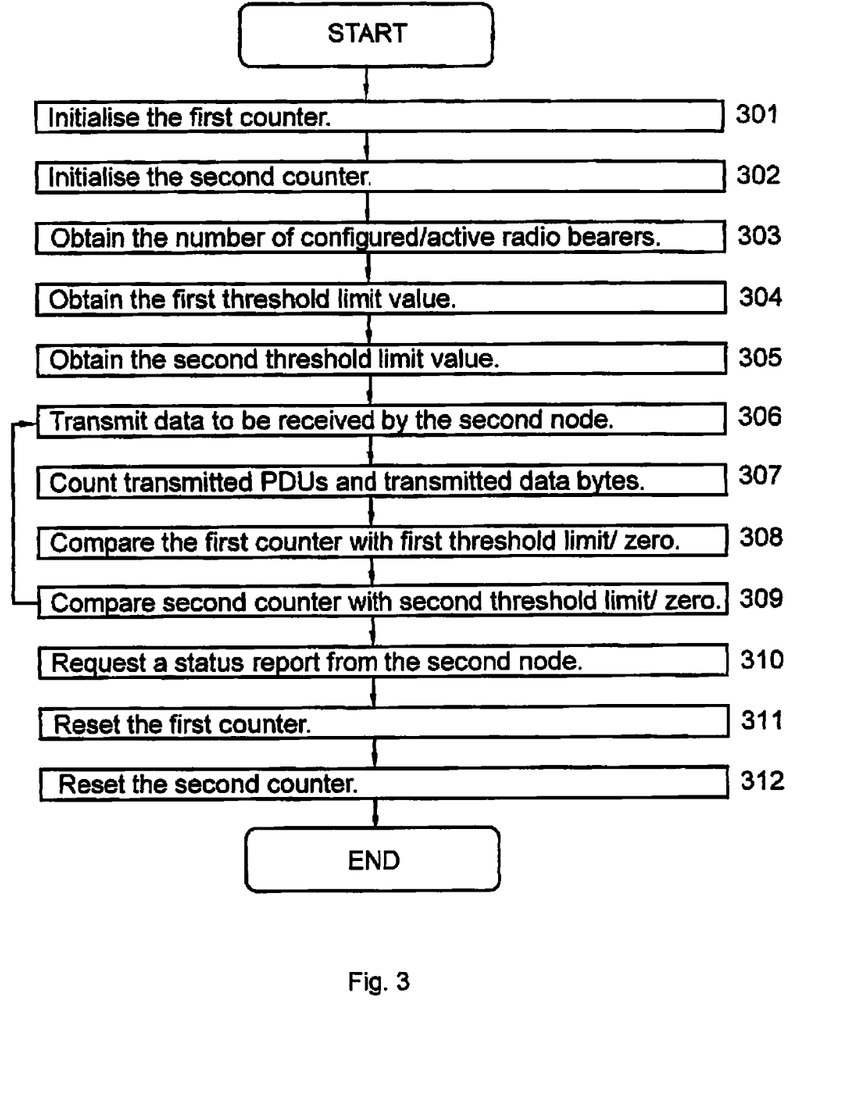
FIG. 3 is a flow chart illustrating embodiments of method steps in a first node.

FIG. 3 is a flow chart illustrating embodiments of method steps 301-312 performed in a first node 110. The method aims at requesting a status report from a second node 120. The action: "To request a status report" may also be referred to as "to send a poll", or "setting a poll bit". In the following text, the expression: "To request a status report" will consistently be used for clarity reasons, but it is to be understood that several other expressions bearing the same meaning might be used instead, e.g. "to send a poll", or "setting a poll bit". The first node 110 and the second node 120 are comprised within a wireless communication network 100. The status report comprising positive and/or negative acknowledgement of data sent from the first node 110 to be received by the second node 120.

As previously discussed, the first node 110 may be a base station and the second node 120 may be a mobile station.

However, any, some or even all of the method steps 301-312 performed in the first node 110, when the first node is represented by a base station, may be distributed between the base station and the control node 130. The control node 130 may be e.g. a Radio Network Controller, RNC. Thus any, some or all of the method steps 301-312 according to embodiments of the present method may be performed entirely or at least to some extent in the control node 130.

However, according to some embodiments, the first node 110 may be a mobile station such as e.g. a mobile phone and the second node 120 may be a base station.

To appropriately request a status report from the second node 120, the method may comprise a number of method steps 301-312. It is however to be noted that some of the described method steps are optional and only comprised within some embodiments. Further, it is to be noted that the method steps 301-312 may be performed in any arbitrary chronological order and that some of them, e.g. step 304 and step 305, or even all steps may be performed simultaneously or in an altered, arbitrarily rearranged, decomposed or even completely reversed chronological order. The method may comprise the following steps:

STEP 301

This step is optional and may only be comprised within some embodiments of the present method. The first counter 421 may be initialised.

According to some embodiments, the first counter 421 may be initialised to zero and adapted to count the number of transmitted data units. Thus the first counter 421 may be incremented according to the transmitted number of data units, until a first predetermined value is reached or exceeded.

However, the first counter 421 may according to some other embodiments be initialised to the first predetermined value. The first counter 421 may then be decreased according to the transmitted number of data units, until zero is reached or fallen below.

STEP 302

This step is optional and may only be comprised within some embodiments of the present method. The second counter 422 may be initialised.

According to some embodiments, the second counter 422 may be initialised to zero and adapted to count the number of transmitted data bytes. According to those embodiments, the second counter 422 may be incremented according to the transmitted number of data bytes, until a second predetermined value is reached or exceeded.

According to other embodiments, the second counter 422 may be initialised to the second predetermined value. The second counter 422 may then be decreased according to the transmitted number of data bytes, until zero is reached or fallen below.

STEP 303

This step is optional. In this step, the number of configured or active radio bearers may be obtained.

The configured radio bearers are given by the Radio Resource Control, RRC. The active radio bearers, i.e. the radio bearers where there is traffic could be determined by the sending node itself based on the transmitted data.

STEP 304

This step is optional and may only be comprised within some embodiments of the present method. A first predefined value related to the number of transmitted data units may be obtained. The first predefined value may be a threshold limit value defining the maximum numbers of data units that may be transmitted before a request for a status report is sent to the second node. The data units may be e.g.

Protocol Data Units, PDUs, according to some embodiments. The first predefined value may be configured by, and obtained from, a higher layer, e.g. the Radio Resource Control, RRC.

STEP 305

This step is optional and may only be comprised within some embodiments of the present method. A second predefined value related to the number of transmitted data bytes, may be obtained. The second predefined value may be a threshold limit value defining the maximum amount of data bytes that may be transmitted before a request for a status report is sent to the second node. The second predefined value may be configured by, and obtained from, a higher layer, e.g. the Radio Resource Control, RRC.

According to some optional embodiments, the step of obtaining the second predefined value comprises obtaining a parameter value representing a bytes threshold limit value and dividing that parameter value with the obtained number of configured or active radio bearers.

STEP 306

The first node 110 transmits data units, to be received by the second node 120.

STEP 307

The number of transmitted data units and the number of transmitted data bytes are counted, as data is sent to be received by the second node 120.

The first node 110 may according to some embodiments comprise a first counter 421 configured to count the number of transmitted data units. According to some embodiments, the first node 110 may comprise a second counter 422. The second counter 422 may be configured to count the number of transmitted data bytes.

The step of counting may optionally comprise to adjust the first counter 421 according to the amount of data units transmitted to the second node 120. Further, the second counter 422 may be adjusted according to the amount of data bytes transmitted to the second node 120.

The step of counting may optionally, according to some embodiments, comprise to increment the first counter 421 according to the amount of data units transmitted to the second node 120. Further, the second counter 422 may be incremented according to the amount of data bytes transmitted to the second node 120.

The step of counting may according to some optional further embodiments, comprise to decrease the first counter 421 according to the amount of data units transmitted to the second node 120. Further, the second counter 422 may be decreased according to the amount of data bytes transmitted to the second node 120.

STEP 308

This step is optional and may only be comprised within some embodiments of the present method. The value of the first counter 421 may be compared with the first predefined value if the first counter 421 has been incremented according to the transmitted amount of data units. The first predefined value may be a threshold limit value defining the maximum numbers of data units that may be transmitted before a request for a status report is sent to the second node.

According to some embodiments, first counter 421 may be compared with zero, if the first counter 421 has been decreased according to the transmitted amount of data units. Thus according to some optional embodiments, wherein the first counter 421 has been initialised and/or reset to the first predetermined value and wherein the first counter 421 has been decreased according to the amount of data units transmitted to the second node 120, the value of the first counter 421 may be compared with zero. The count down from the first predefined value to zero may then correspond to the maximum numbers of data units that may be transmitted before a request for a status report is sent to the second node.

According to some embodiments, the absolute value of the first counter 421, i.e. the magnitude of the first counter 421 may be compared with the absolute value i.e. the magnitude of the first predefined value.

STEP 309

This step is optional and may only be comprised within some embodiments of the present method. The value of the second counter 422 may be compared with the second predefined value if the second counter 422 has been incremented according to the transmitted amount of data bytes. The second predefined value may be a threshold limit value defining the maximum amount of data bytes that may be transmitted before a request for a status report is sent to the second node.

According to some embodiments, second counter 422 may be compared with zero, if the second counter 422 has been decreased according to the transmitted amount of data bytes. Thus, according to some optional embodiments, wherein the second counter 422 has been initialised and/or reset to the first predetermined value and wherein the second counter 422 has been decreased according to the amount of data bytes transmitted to the second node 120, the value of the second counter 422 may be compared with zero. The count down from the second predefined value to zero may then correspond to the maximum numbers of data bytes that may be transmitted before a request for a status report is sent to the second node.

According to some embodiments, the absolute value of the second counter 422, i.e. the magnitude of the second counter 422 may be compared with the absolute value i.e. the magnitude of the second predefined value.

STEP 310

A status report is requested from the second node 120 if the counted number of transmitted data units or the counted number of transmitted data bytes exceeds predefined values.

According to some optional embodiments, a status report may be requested from the second node 120 if the maximum numbers of data units that may be transmitted is reached or exceeded by the first counter 421 or if the maximum numbers of data bytes that may be transmitted is reached or exceeded by the second counter 422.

According to some further optional embodiments, a status report may be requested from the second node 120 if the first predefined value is reached or exceeded by the first counter 421 or if the second predefined value is reached or exceeded by the second counter 422.

According to yet some further optional some embodiments, wherein the first counter 421 and/or the second counter 422 has been initialised and/or reset to the first predefined value and/or the second predefined value respectively, a status report may be requested from the second node 120 if zero is reached or fallen below by the first counter 421 or if zero is reached or fallen below by the second counter 422.

STEP 311

This step is optional and may only be comprised within some embodiments of the present method. The first counter 421 may be reset to zero. According to yet some optional embodiments, the first counter 421 may be reset to the first predetermined value.

Optionally, the first counter 421 may be reset when the first predefined value is reached or exceeded by the first counter 421 or if the second predefined value is reached or exceeded by the second counter 422.

According to some further optional embodiments, the first counter 421 may be reset when zero is reached or fallen below by the first counter 421 or if zero is reached or fallen below by the second counter 422.

According to some embodiments, the first counter 421 may be reset when a request for a status report is sent to the second node 120, or when a poll bit is set to 1.

STEP 312

This step is optional and may only be comprised within some embodiments of the present method. The second counter 422 may be reset to zero. According to yet some optional embodiments, the second counter 422 may be reset to the second predetermined value.

Optionally, the second counter 422 may be reset when the first predefined value is reached or exceeded by the first counter 421 or when the second predefined value is reached or exceeded by the second counter 422.

According to some further optional embodiments, the second counter 422 may be reset when zero is reached or fallen below by the first counter 421 or if zero is reached or fallen below by the second counter 422.

According to some embodiments, the second counter 422 may be reset when a request for a status report is sent to the second node 120, or when a poll bit is set to 1.

Figure 4:
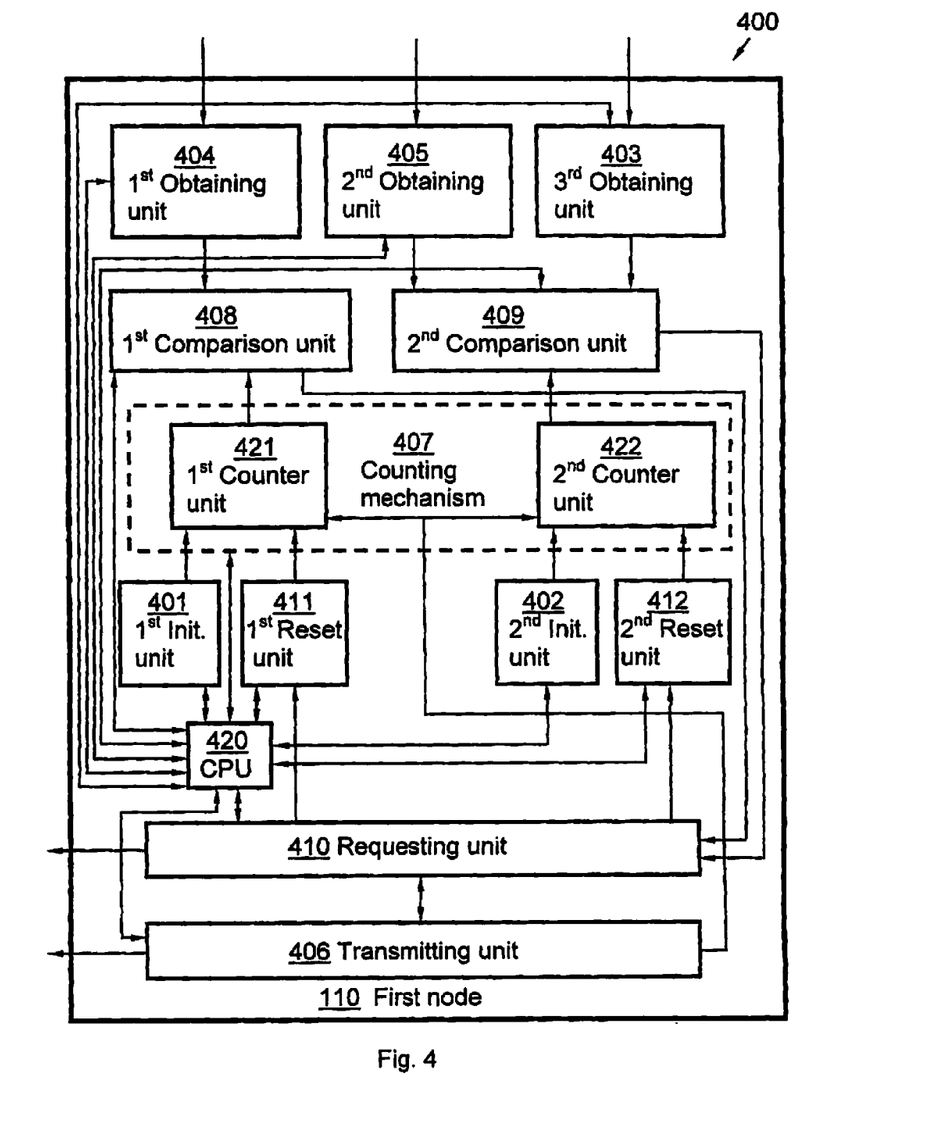
FIG. 4 is a block diagram illustrating embodiments of an arrangement in a first node.

FIG. 4 is a block diagram illustrating embodiments of an arrangement 400 situated in the first node 110. The arrangement 400 is configured to perform the method steps 301-312 for requesting a status report from the second node 120. The first node 110 and the second node 120 are both comprised within a wireless communication network 100. The status report comprises positive and/or negative acknowledgement of data sent from the first node 110 to be received by the second node 120. The first node 110, wherein the present arrangement 400 is comprised may be represented by a user equipment such as e.g. a mobile phone, according to some embodiments. However, according to some embodiments, the first node 110 may be represented by a base station such as e.g. an evolved NodeB (eNodeB). According to other embodiments, the first node 110 may be represented by a control node 130 such as e.g. a Radio Network Controller (RNC).

For the sake of clarity, any internal electronics of the arrangement 400, not completely necessary for performing the present method has been omitted from FIG. 4.

The arrangement 400 comprises a transmitter 406. The transmitter 406 is adapted to transmit a sequence of data units or data unit segments, data units, to be received by the second node 120. The arrangement 400 also comprises a counting mechanism 407, adapted to count the number of transmitted data units and the number of transmitted data bytes. The counting mechanism 407 may according to some embodiments comprise a first counter 421. The optional first counter 421 may be adapted to count the number of transmitted data units. The counting mechanism 407 may optionally comprise a second counter 422. The second counter 422 may be adapted to count the number of transmitted data bytes. Further, the arrangement 400 comprises a requesting unit 410. The requesting unit 410 is adapted to request a status report from the second node 120. The status report is requested if the counted number of transmitted data units or the counted number of transmitted data bytes exceeds predefined values. The data units may be e.g. PDUs.

The requesting unit 410 may, according to some optional embodiments, be adapted to send a request for a status report from the second node 120 if the first predefined value is reached or exceeded by the first counter 421 or if the second predefined value is reached or exceeded by the second counter 422.

The counting mechanism 407, comprised within the arrangement 400 may according to some embodiments further comprise a first counter 421. The first counter 421 may be configured to count the number of transmitted data units. The counting mechanism 407 may further comprise a second counter 422. The second counter 422 may be configured to count the number of transmitted data bytes.

The arrangement 400 may according to some embodiments comprise a first obtaining unit 404. The optional first obtaining unit 404 may be adapted to obtain a first predefined value related to the number of transmitted data units.

The arrangement 400 may according to some embodiments comprise a second obtaining unit 405. The optional second obtaining unit 405 may be adapted to obtain a second predefined value related to the number of transmitted data bytes. According to yet some embodiments, the second obtaining unit 405 may be further adapted to obtain a parameter value representing a bytes threshold limit value and dividing that parameter value with the obtained number of configured or active radio bearers.

According to some embodiments, the arrangement 400 may comprise a first comparison unit 408. The first comparison unit 408 may be adapted to compare the value of the first counter 421 with the first predefined value. The first predefined value is related to the number of transmitted data units and may represent a maximum threshold limit value.

According to some embodiments, the arrangement 400 may comprise a second comparison unit 409. The second comparison unit 409 may be adapted to compare the value of the second counter 422 with the second predefined value. The second predefined value is related to the number of transmitted data bytes and may represent a maximum threshold limit value.

As previously discussed, the first predefined value and the second predefined value are configured by and obtained from a higher layer, e.g. the Radio Resource Control, RRC.

The arrangement 400 may optionally, according to some embodiments, comprise a first initialising unit 401. The first initialising unit 401 may be adapted to initialise the first counter 421 to zero. According to some embodiments, the first initialising unit 401 may be adapted to initialise the first counter 421 to the first predetermined value.

According to some embodiments, the arrangement 400 may comprise a second initialising unit 402. The second initialising unit 402 may be adapted to initialise the second counter 422 to zero. According to some embodiments, the second initialising unit 402 may be adapted to initialise the second counter 422 to the second predetermined value.

Further, according to some embodiments of the present arrangement 400, a first resetting unit 411 may be comprised. The first resetting unit 411 may be adapted to reset the first counter 421 to zero. According to some embodiments, the first resetting unit 411 may be adapted to reset the first counter 421 to the first predetermined value.

Some embodiments of the present arrangement 400 may comprise a second resetting unit 412. The second resetting unit 412 may be adapted to reset the second counter 422 to zero. According to some embodiments, the second resetting unit 412 may be adapted to reset the second counter 422 to the second predetermined value.

The arrangement 400 may according to some embodiments comprise a third obtaining unit 403. The third obtaining unit 403 may be adapted to obtain the number of configured or active radio bearers.

The arrangement 400 may according to some embodiments comprise a processing unit 420. The processing unit 420 may be represented by e.g. a Central Processing Unit (CPU), a processor, a microprocessor, or processing logic that may interpret and execute instructions. The processing unit 420 may perform all data processing functions for inputting, outputting, and processing of data including data buffering and device control functions, such as call processing control, user interface control, or the like.

It is to be noted that the described units 401-422 comprised within the arrangement 400 are to be regarded as separate logical entities but not with necessity separate physical entities. Any, some or all of the units 401-422 may be comprised or co-arranged within the same physical unit. However, in order to facilitate the understanding of the functionality of the arrangement 400, the comprised units 401-422 are illustrated as separate physical units in FIG. 4.

Some Particular Embodiments

The method in the first node 110 for requesting a status report from the second node 120, according to the present method may be implemented through one or more processors 420 in the first node 110, together with computer program code for performing the functions of the method. The program code mentioned above may also be provided as a computer program product, for instance in the form of a data carrier carrying computer program code for performing the method according to the present invention when being loaded into the processing unit 420. The data carrier may be a CD ROM disc, a memory stick, or any other appropriate medium such as a disk or tape that can hold machine readable data. The computer program code can furthermore be provided as pure program code on a server and downloaded to the first node 110 remotely.

Thus a computer program comprising instruction sets for performing the method according to at least some of the method steps 300-312 may be used for implementing the previously described method.

As will be appreciated by one of skill in the art, the present invention may be embodied as an arrangement 400 within a first node 110, a method or a computer program product. Accordingly, the present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in any arbitrary object oriented programming language such as Java®, Smalltalk or C++. However, the computer program code for carrying out the steps of the present method may also be written in any conventional procedural programming languages, such as the "C" programming language and/or a lower level assembler language. The program code may execute entirely on the arrangement 400, partly on the arrangement 400, as a stand-alone software package, partly on the arrangement 400 and partly on a remote computing device or entirely on the remote computing device. In the latter scenario, the remote computing device may be connected to the arrangement 400 through a local area network (LAN) or a wide area network (WAN), or the connection may be made to an external computer, for example, through the Internet using e.g. an Internet Service Provider.

Furthermore, the present method is described in part above with reference to flowchart illustrations in FIG. 2 and FIG. 3 and/or block diagrams of arrangements, methods, and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks in FIG. 2 or FIG. 3.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A computer program product comprising instructions stored on a non-transitory storage medium which, when executed by processor circuitry of a user equipment, perform at least the acts of:

initializing a protocol data unit (PDU) counter and a byte counter;

counting, by the PDU counter, PDUs being transmitted from the user equipment to a node in a wireless telecommunication network;

counting, by the byte counter, bytes being transmitted from the user equipment to the node; and triggering a poll to request an RLC protocol status report from the node and resetting both the PDU counter and the byte counter when:

i) the PDU counter becomes equal to or greater than a predetermined PDU threshold; or ii) the byte counter becomes equal to or greater than a predetermined byte threshold.

2. The computer program product of claim 1, wherein the acts further comprise:

initializing the PDU counter to zero, and initializing the byte counter to zero.

3. The computer program product of claim 1, wherein the acts further comprise obtaining, from Radio Resource Control (RRC), the PDU threshold and the byte threshold.

4. The computer program product of claim 1, wherein the node is selected from the group consisting of:

a control node;

a base station;

a Radio Network Controller (RNC); and an evolved NodeB (eNodeB).

5. A computer program product comprising instructions stored on a non-transitory storage medium which, when executed by processor circuitry of a user equipment, perform at least the acts of:

initializing a protocol data unit (PDU) counter and a byte counter;

decreasing the PDU counter based on a number of PDUs being transmitted from the user equipment to a node in a wireless telecommunication network;

decreasing the byte counter based on a number of bytes being transmitted from the user equipment to the node; and triggering a poll to request an RLC protocol status report from the node and resetting both the PDU counter and the byte counter when:

i) the PDU counter becomes equal to or less than a predetermined PDU threshold; or ii) the byte counter becomes equal to or less than a predetermined byte threshold.

6. The computer program product of claim 5, wherein the acts further comprise:

initializing the PDU counter to the predetermined PDU threshold, and initializing the byte counter to the predetermined byte threshold.

7. The computer program product of claim 5, wherein the acts further comprise obtaining, from Radio Resource Control (RRC), the PDU threshold and the byte threshold.

8. The computer program product of claim 5, wherein the node is selected from the group consisting of:

a control node;

a base station;

a Radio Network Controller (RNC); and an evolved NodeB (eNodeB).

9. An electronic circuit of a user equipment comprising:

a memory configured to store coded instructions; and wherein the electronic circuit when executing the coded instructions is configured to perform at least the acts of:

initializing a protocol data unit (PDU) counter and a byte counter;

counting, by the PDU counter, PDUs being transmitted from the user equipment to a node in a wireless telecommunication network;

counting, by the byte counter, bytes being transmitted from the user equipment to the node; and triggering a poll to request an RLC protocol status report from the node and resetting both the PDU counter and the byte counter when:

i) the PDU counter becomes equal to or greater than a predetermined PDU threshold; or ii) the byte counter becomes equal to or greater than a predetermined byte threshold.

10. The integrated circuit of claim 9, wherein the acts further comprise:

initializing the PDU counter to zero, and initializing the byte counter to zero.

11. The integrated circuit of claim 9, wherein the acts further comprise obtaining, from Radio Resource Control (RRC), the PDU threshold and the byte threshold.

12. The integrated circuit of claim 9, wherein the node is selected from the group consisting of:

a control node;

a base station;

a Radio Network Controller (RNC); and an evolved NodeB (eNodeB).

13. An electronic circuit of a user equipment comprising:

a memory configured to store coded instructions; and wherein the electronic circuit when executing the coded instructions is configured to perform at least the acts of:

initializing a protocol data unit (PDU) counter and a byte counter;

decreasing the PDU counter based on a number of PDUs being transmitted from the user equipment to a node in a wireless telecommunication network;

decreasing the byte counter based on a number of bytes being transmitted from the user equipment to the node; and triggering a poll to request an RLC protocol status report from the node and resetting both the PDU counter and the byte counter when:

iii) the PDU counter becomes equal to or less than a predetermined PDU threshold; or iv) the byte counter becomes equal to or less than a predetermined byte threshold.

14. The integrated circuit of claim 13, wherein the acts further comprise:

initializing the PDU counter to the predetermined PDU threshold, and initializing the byte counter to the predetermined byte threshold.

15. The integrated circuit of claim 13, wherein the acts further comprise obtaining, from Radio Resource Control (RRC), the PDU threshold and the byte threshold.

16. The integrated circuit of claim 13, wherein the node is selected from the group consisting of:

a control node;

a base station;

a Radio Network Controller (RNC); and an evolved NodeB (eNodeB).

* * * * *